United States Patent Office 3,470,767
Patented Oct. 7, 1969

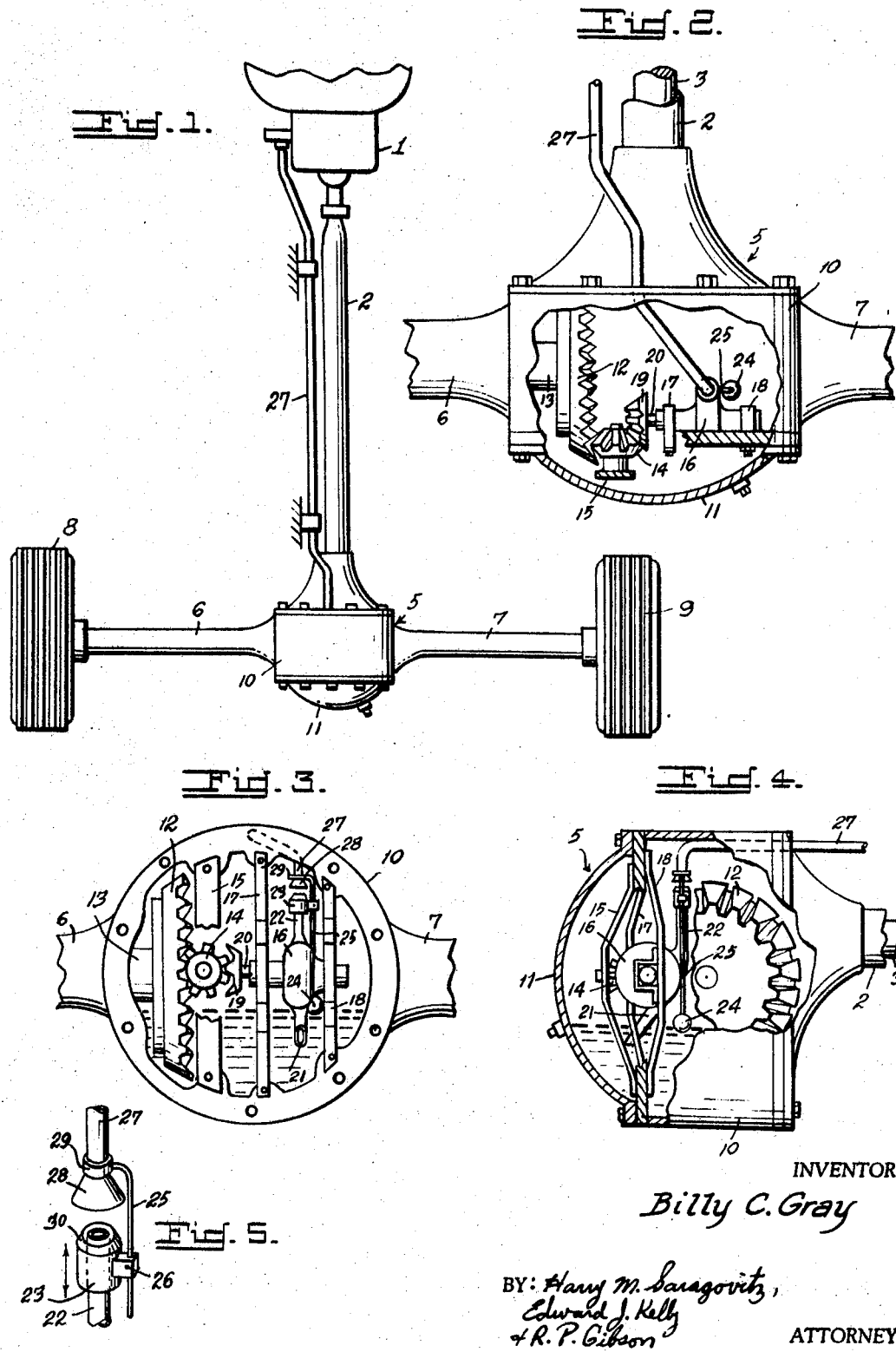

3,470,767
OIL TRANSFER PUMP FOR VEHICLES
Billy C. Gray, 765 Debaca Road,
Las Cruces, N. Mex. 88001
Filed Mar. 19, 1968, Ser. No. 714,293
Int. Cl. F16h 1/38
U.S. Cl. 74—710                    5 Claims

ABSTRACT OF THE DISCLOSURE

An oil transfer pump compensating for the drainage of oil, through worn seals, from the transmission of a vehicle and through the drive shaft housing into the differential, and consists of a pump in mesh with the ring gear of the differential and a device having a float which, when the oil level in the differential becomes excessive, rises to complete a pipe line connection whereby the excess oil is pumped to the transmission.

---

The invention described herein may be manufactured, used, and licensed by or for the Government for governmental purposes without the payment to me of any royalty thereon.

A perplexing problem in motor vehicle lubrication in which the drive shaft is encased between the transmission and the differential, has been the seepage of oil from the transmission, due to worn seals, through the drive shaft casing and into the differential.

Unless constantly checked, this seepage of oil resulted in an excess amount of oil in the differential which eventually caused pressure on the rear axle oil seals and, in turn, accumulated on the brake linings to result in brake failure. Also, the oil level in the transmission would become dangerously low and result in damaged gears, thus causing great expense in replacement thereof.

The present invention is designed to correct the aforesaid conditions and permit operation of the vehicle without frequent inspections of the oil level in the transmission and differential and consists of a system for returning the excess oil in the differential to the transmission automatically by a pump rotated by the ring gear of the differential and a float device which connects the pump to a pipe line leading to the transmission when the oil level becomes excessive in the differential.

It is therefore an object of this invention to provide an automatic means for replenishing oil in the transmission of a vehicle that has been lost by seepage through worn oil seals.

It is another object to provide a float and pump mechanism mounted in the differential of a vehicle which will automatically pump excess oil therein back to the vehicle's transmission.

A further object is to provide a pump in the differential of a vehicle that is continuously operated by the ring gear of the differential.

A still further object is to provide a pipe line beteween the transmission and differential of a vehicle whereby the ecess oil in the differential may be returned to the transmission.

A final object is to provide an oil level balancing system in a vehicle to automatically maintain the oil level of the transmission and differential to prevent damage to the transmission gearing, oil seals in the rear axle and to prevent failure of the rear wheel brakes due to oil seepage on the brake linings.

These and other objects and advantages of the present invention will be fully apparent from the following description when taken in connection with the annexed drawing, in which:

FIG. 1 is a partial plan view of a portion of a motor vehicle and showing an oil return pipe line between the transmission and the differential;

FIG. 2 is a partial plan view of the differential housing with parts broken away to expose the oil transfer pump of the invention;

FIG. 3 is a rear view of the differential housing, the rear plate being removed;

FIG. 4 is a side elevation of the differential housing, partly in section, and,

FIG. 5 is a perspective view of the slidable oil return pipe connection on a larger scale.

Referring in detail to the drawing in which like reference numerals designate like parts throughout the several views, reference numeral 1 indicates a housed transmission of a motor vehicle having a drive shaft housing 2 which encases a drive shaft 3, a portion of which is seen in FIGS. 2 and 4.

Drive shaft 3 and housing 2 are connected to the transmission and a differential indicated generally by 5.

Extending on either side of differential 5 are rear axle housings 6 and 7 and wheels 8 and 9 are carried by the rear axles as seen in FIG. 1, a portion 13 of one being seen in FIG. 3.

Differental 5 is of the conventional type having a housing 10 with a removable rear plate 11.

In FIGS. 2, 3 and 4, the gearing necessary to drive one rear axle is shown for sake of clarity, and only that part of the gearing necessary to drive the oil transfer pump of this invention is illustrated.

A ring gear 12 is shown in FIGS. 2, 3 and 4 and is carried by rear axle 13.

An idler gear 14 is supported by a diametrical strap 15 which is secured to the differential 5 as shown, and is in constant mesh with ring gear 12.

A pump 16, preferably of the centrifugal type, is also supported by diametrically arranged straps 17 and 18.

A gear 19 on a shaft 20, which rotates pump 16, meshes with idler gear 14.

Pump 16 is provided with a downwardly extending pipe 21 which is intended to be submerged, at a predetermined level, in the oil of the differential, as seen in FIGS. 3 and 4, the level selected being the normal level of the oil to be contained therein.

A second pipe 22 extends upwardly from pump 16 as shown best in FIG. 3.

Since pump 16 is in constant operation as long as ring gear 12 rotates, a float device is provided to interrupt the flow of oil to the transmission, and consists of a nipple 23 which is slidable on pipe 22. A float 24 attached to a rod 25 which, in turn, is fixed to nipple 23 at 26, best seen in FIG. 5.

An oil return pipe 27 extends between the transmission 1 to the interior of differential 1 and its inner end is aligned in axial relation with respect to pipe 22 and is spaced therefrom as best seen in FIG. 5. The inner end of pipe 22 is flared as at 28.

Rod 25 is fixed to a guide ring 29 which is slidable on pipe 27, so that the float when rising due to an excess oil level in the differential will move the rod 25 which carries nipple 23 upward until a beveled portion 30 on nipple 23 mates with the flared portion 28 to complete a connection between pipes 22 and 27 whereby the excess oil in the differential is pumped through pipes 22 and 27 to transmission 1. When the oil level in the differential drops, then float 24 moves down and rod 25 moves nipple 23 down to break the connection and the pump 16 will idle until the level of oil becomes again excessive.

As long as the vehicle is in motion, the device will compensate for the oil levels in the differential and the transmission.

While only a preferred form of the invention is shown and described, other forms of the invention are contem-

What is claimed is:

1. In combination with a vehicle including a housed transmission, a housed differential and a housed drive shaft in driving connection between said transmission and said differential, there being an axle driving ring gear in said differential, the invention comprising: a fluid connection between the transmission housing and the differential housing, a first means supported in the housing of said differential being in driving connection with said ring gear, and a second means associated with said first means which when activated by an excess oil level in the differential housing connects said first means with said fluid connection whereby the excess oil will be returned to the housing of said transmission by said first means.

2. A device as set forth in claim 1 wherein said fluid connection comprises a pipe connected at one end of its ends to the housing of said transmission and having its other end extended a distance into the housing of the housing of said transmission.

3. A device as set forth in claim 1 wherein said first means comprises: a pump supported in the housing of said differential; a driving shaft connected to said pump; a gear on said shaft, and an idler gear in mesh with said gear and said ring gear, said pump having a downwardly extending inlet pipe and an upwardly extending outlet pipe, said last named pipe being in alignment with and in spaced relation from said fluid connection.

4. A device as set forth in claim 1 wherein said second means comprises a float assembly including a rod slidable at one of its ends on said fluid conduit, a connecting member carried by said rod, a float fixed to the other end of said rod and being adapted to rise upon an excessive level of oil in the housing of said differential to move said connecting member to connect said fluid connection with said first means whereby the excess oil in the housing of said differential is returned to said transmission.

5. A device as set forth in claim 4 wherein said connecting member comprises a nipple slidably mounted on said second means and fixed to said rod whereby said nipple will be moved upon vertical movement of said rod to bring said first means in and out of fluid communication with said fluid connection.

References Cited

UNITED STATES PATENTS

| | | | |
|---|---|---|---|
| 1,843,070 | 1/1932 | Shoemaker | 74—213 |
| 3,182,527 | 5/1965 | Bryan | 74—213 |
| 3,233,549 | 2/1966 | Howe | 103—26 |

LEONARD H. GERIN, Primary Examiner

U.S. Cl. X.R.

103—28, 41